United States Patent [19]

Hamada

[11] Patent Number: 5,946,701
[45] Date of Patent: Aug. 31, 1999

[54] DOCUMENT PROCESSING APPARATUS

[75] Inventor: Hidetoshi Hamada, Kanagawa, Japan

[73] Assignee: Fuji Xerox Co., Ltd., Tokyo, Japan

[21] Appl. No.: 08/634,679

[22] Filed: Apr. 18, 1996

[30] Foreign Application Priority Data

Apr. 20, 1995 [JP] Japan .................................. 7-117739

[51] Int. Cl.⁶ .................................................. G06F 17/21
[52] U.S. Cl. ........................................................ 707/516
[58] Field of Search ............................ 707/500, 514, 707/515, 516, 517, 513

[56] References Cited

U.S. PATENT DOCUMENTS

| | | | |
|---|---|---|---|
| 5,051,930 | 9/1991 | Kuwabara et al. | 707/516 |
| 5,652,876 | 7/1997 | Ashe et al. | 707/516 X |
| 5,669,005 | 9/1997 | Curbow et al. | 707/516 X |
| 5,752,056 | 5/1998 | Celik | 707/516 |

FOREIGN PATENT DOCUMENTS

| | | |
|---|---|---|
| 63-24463 | 2/1988 | Japan . |
| 2-59857 | 2/1990 | Japan . |
| 5-81400 | 4/1993 | Japan . |
| 6-168092 | 6/1994 | Japan . |

*Primary Examiner*—Joseph H. Feild
*Attorney, Agent, or Firm*—Finnegan, Henderson, Farabow, Garrett & Dunner, L.L.P.

[57] ABSTRACT

In a document processing apparatus for creating composite documents formed of document element objects by correlating a number of document element data, as well as a number of editing programs for conversion-processing document data of different type into document element data being provided, data type information which is able to be processed by each of the editing programs is stored in a list, a start means starts a corresponding editing program based on the data type information and information stored in the list with respect to document data which is to be processed and which is stored in a clipboard, and a synthesizing means correlates document element data obtained by converting the document data with composite document data and synthesizes document element objects into the composite document.

4 Claims, 8 Drawing Sheets

| PROGRAM FILE NAME | DATA TYPE |
|---|---|
| textedit.exe | LETTER ROW |
| bitmap.dll | BITMAP |
| figure.exe | GRAPHICS |
| table.dll | TABLE |
| graph.exe | GRAPH |

| PROGRAM FILE NAME | DATA TYPE | PRIORITY ORDER |
|---|---|---|
| text-a.exe | LETTER ROW | 1 |
| bitmap.dll | BITMAP | |
| text-b.exe | LETTER ROW | 3 |
| table.dll | TABLE | |
| text-c.exe | LETTER ROW | 2 |

| PROGRAM FILE NAME |
|---|
| textedit.exe |
| bitmap.dll |
| figure.exe |
| table.dll |
| graph.exe |

| PROGRAM FILE NAME | PRIORITY ORDER |
|---|---|
| textedit.exe | 1 |
| bitmap.dll | 5 |
| figure.exe | 2 |
| table.dll | 4 |
| graph.exe | 3 |

DOCUMENT PROCESSING APPARATUS

BACKGROUND OF THE INVENTION

The present invention relates to a document processing apparatus for synthesizing a plurality of document element objects as if they are adhered to a document printed on a paper medium, to create a composite document, and in particular, it relates to a document processing apparatus which conversion-processes document data into document element objects.

The present applicant has been already proposed a document processing apparatus which synthesizes document element objects comprising electronic document data as if the objects were adhered to a document printed on a paper medium, thus creating electronic composite document data, and further treating the created composite document data as if it were a document on a paper medium (Japanese Patent Application No. Hei. 6-278323).

This document processing apparatus creates a composite document 21 as shown in FIG. 11, and also performs edit processing etc., this composite document being synthesized by superimposing document element objects A, B, C, D and E for example.

The document element object A is a so-called parent document, and is a text document created by a text application comprising a word processor. Also, document element objects B, C and D are so-called child documents which overlap the document element object A, B being a graph document created by a chart application and document element objects C and D being a graphic document created by a graphics application. Also, document element object E is a so-called grandchild document which overlaps the document element object B and is a text document created with a text application.

The real data of the document element objects A through E are created as a real data frame, and relationship data between document element object A and document element objects B through D and relationship data between document element object B and document element object E are each created as a relationship data frame. Document element data of the document element objects A through E are formed by pairs of these real data and relationship data.

The real data frame has data rows which include essential data and storage data rows which include pointers to the relationship data frames. Included in the data rows are a creation environment of the creator, creation time, etc. of the document element object, the name of the application used to create the document element object, display data converted from the document data of the document element object into a format which does not exist in the creation application, application data which is document data from the creation application, etc. Also, a plurality of pointers can be included in the storage data rows, which are matched to the relationship data frame of other overlapping document element objects via each of these pointers.

Note that the display data are converted into uniform format display data such as PostScript (TM) using the print function of the application used to create the document data (creation application), so that display and printing can be performed with the display data without using the creation application. In the present embodiment, these display data are bit map data, in which output of the document element object can be realized but editing of the document element object cannot be realized.

On the other hand, the application data are document data which exist in the creation application and editing of the document element object can be realized using the application data by starting the relevant creation application.

The relationship data frame also has data rows which include essential data and storage data rows which include pointers to the document element objects. Included in the data rows are a mounting position for the document element object, mounting size, mounting role for what role the document element object has in the composite document, overlapping order for when the document element object is overlapped, etc. Also, the storage data rows include a pointer and are matched to the real data frame of a corresponding document element object via this pointer.

In outline, the document element objects A through E are each formed on an imaginary document creation region 22, and the document element objects A through E are superimposed by overlapping and matching these document creation regions 22 to form a composite document 21. The real data frame 23 of the parent document element object A is matched to the real data frames 24 through 26 and respective relationship data frames 27 through 29 of the child document element objects B through D, while the real data frame 30 of the document element object E which is superimposed on the document element object B is matched to the real data frame 24 of the document element object B via the relationship data frame 31.

Corresponding relationships of the above real data frames and relationship data frames are made by the pointers, access from a given real data frame to another overlapping real data frame via relationship data frame being possible by following the pointer. The real data frames and relationship data frames matched by the pointers form in their entirety the composite document data, each of these real data frames and relationship data frames being stored in a memory device as matched independent data units and being readable and writable in data units.

As shown in FIG. 12, as well as creation environments, display data and application data, the names of the creation applications used to create document data of the document element objects are included as "text", "charts", "graphics" and "text" in the real data frames 23 through 26 and 30 of the document element objects A through E.

Also, included in the relationship data frames 27 through 29 between the real data frame 23 and the real data frames 24 through 26, as well as the relationship data frame 31 between the real data frame 24 and the real data frame 30 are, together with mounting positions, mounting sizes and overlapping orders, the mounting roles.

Specifically, in the relationship data frame 27 the document element object B is mounted on document element object A in the second overlapping order, movement of the mounting position of the document element object B afterwards being prohibited, and the document element object B includes data to the effect of achieving an original of the composite document 21. Also, in the relationship data frame 28 the document element object C is mounted on document element object A in the first overlapping order, the document element object C including data to the effect of achieving a comment of the composite document 21. Further, in the relationship data frame 29 the document element object D is mounted on document element object A in the foremost zero overlapping order, modifications to the content of the document element object D afterwards being prohibited, and the document element object D includes data to the effect of achieving an original of the composite document 21. Further still, in the relationship data frame 31 the document element object E is mounted on the document element object B in the foremost zero overlapping order, movement of the mounting position of the document element object E afterwards being prohibited, and the document element object E includes data to the effect of achieving an original of the composite document 21.

Note that as a document processing apparatus for creating such a composite document, other prior art apparatuses of various formats have been proposed (Japanese Patent Unexamined Publication No. Sho. 63-24463, Japanese Patent Unexamined Publication No. Hei. 6-168092).

Also, in the prior art, document processing apparatuses which, when mounting objects of letter row data in the document (Japanese Patent Unexamined Publication No. Hei. 2-59857) or when mounting objects of image data in the document (Japanese Patent Unexamined Publication No. Hei. 5-81400), store the object in a storage means such as a so-called clipboard etc., making it possible to repeatedly mounting process the same object, have been proposed.

Here, in order to create a composite document which is displayable and printable without existing in the creation application, it is necessary to include, in the document element data for achieving each document element object, display data of uniform format converted using the print function of the creation application as described above. Then, it is necessary for this conversion process to execute an editing program on the document data which are to be made document element objects, corresponding to the type of data. For example, it is necessary for document data of letter row data to be conversion processed by a letter row editing program, and document data of graphic data to be conversion processed by a graphic editing program.

However, in cases where the document processing apparatus is provided with only one editing program, only document data of a type which can be processed by this editing program can be made document element objects, and there is the problem that the expected object of freely mounting and matching various types of objects in the manner of a paper medium document to create a composite document cannot be achieved.

In contrast, if a number of types of editing programs are provided in the document processing apparatus, although various types of document data can be made document element objects, each time the user switches programs to operate them, operation becomes difficult and creation of a composite document takes long man-hours, and there is the problem that the expected object of mounting and matching various types of objects in the manner of a paper medium document to simply create a composite document cannot be achieved.

SUMMARY OF THE INVENTION

The present invention was devised in light of the above prior art situation, and has an object to provide a document processing apparatus which simplifies the conversion operation from document data to document element objects and which can create a composite document as if it treats a paper medium document.

In order to achieve this object, a first aspect of the document processing apparatus according to the present invention, in a document processing apparatus for creating composite documents formed of document element objects by correlating a plurality of document element data, comprises a storage means for storing document data which is to be processed, together with data type information thereof, a plurality of document decomposing means for conversion-processing different type document data into document element data, a list means for storing data type information able to be processed by each of the document decomposing means, a start means for starting corresponding document decomposing means based on the data type information and storage information of the list means, with respect to the document data stored in the storage means, and a synthesizing means for synthesizing the document element objects into a composite document by correlating the document element data obtained from the document decomposing means with compsite document data.

Also, a second aspect of the document processing apparatus of the present invention, in a document processing apparatus for creating composite documents formed of document element objects by correlating a plurality of document element data, comprises a storage means for storing document data which is to be processed, together with data type information thereof, a plurality of document decomposing means for conversion-processing different type document data into document element data, a list means for storing information on the document decomposing means, a start means for starting document decomposing means based on storage information of the list means, with respect to the document data stored in the storage means, and a synthesizing means for synthesizing the document element objects into a composite document by correlating the document element data obtained from the document decomposing means with composite document data, the start means sequentially starting another document decomposing means based on storage information of the list means when a conversion result cannot be obtained from one document decomposing means.

Further, a third aspect of the document processing apparatus according to the present invention, in the document processing apparatus of the second aspect, is characterized in that the document decomposing means has judging means for judging whether document data can be conversion processed by itself and the start means sequentially starts another document decomposing means based on storage information of the list means, according to the judgment result by the judging means.

Further still, a fourth aspect of the document processing apparatus according to the present invention, in the document processing apparatus of any of the first to third aspects, is characterized in that the priority order information of the document decomposing means started by the start means is stored in the list means.

In the first aspect of the document processing apparatus, document data to be made a document element object is stored together with data type information thereof in a storage means such as a clipboard or the like, and a start means starts a document decomposing means comprising an editing program etc. with respect to the relevant document data, based on the data type information and storage information of a list means. In other words, in the list means is stored information of the document decomposing means for conversion-processing document data into a document element object according to the data type thereof, and the document decomposing means corresponding to the document data which is to be processed is started.

As a result of this, the document decomposing means converts the document data to document element data which includes display data etc., and a synthesizing means synthesizes a document element object into a composite document by matching the relevant document element data with composite document data which is to be mounted.

Also, in the list means of the document processing apparatus of the second aspect is stored in list form information on the document decomposing means provided in the apparatus, and the start means starts one document decomposing means based on the list of the list means. Then, when one document decomposing means does not correspond to the type of document data stored in the storage means and a conversion result (document element data) cannot be obtained, the start means repeatedly performed a process of starting another document decomposing means based on the list of the list means, and performs conversion processing by means of any one of the document decomposing means provided in the apparatus.

Although judgment as to whether a conversion result described above is obtainable is also possible by measuring a predetermined processing time by means of a timer or the like, in the document processing apparatus of the third aspect, a judgment means provided in the document decomposing means judges whether document data can be conversion processed and the start means sequentially starts other document decomposing means according to this judgment result.

Also, in the document processing apparatus of the fourth aspect, the start means starts the document decomposing means based on priority sequence information stored in the list means and converts the document data to document element data.

DETAILED DESCRIPTION OF THE INVENTION

Herebelow, an embodiment of the document processing apparatus of the present invention will be explained with reference to the drawings.

Note that the document processing apparatus of the present embodiment uses a document processing apparatus already proposed by the present applicant and described above, and that the following description refers to items described above.

Figure 1:
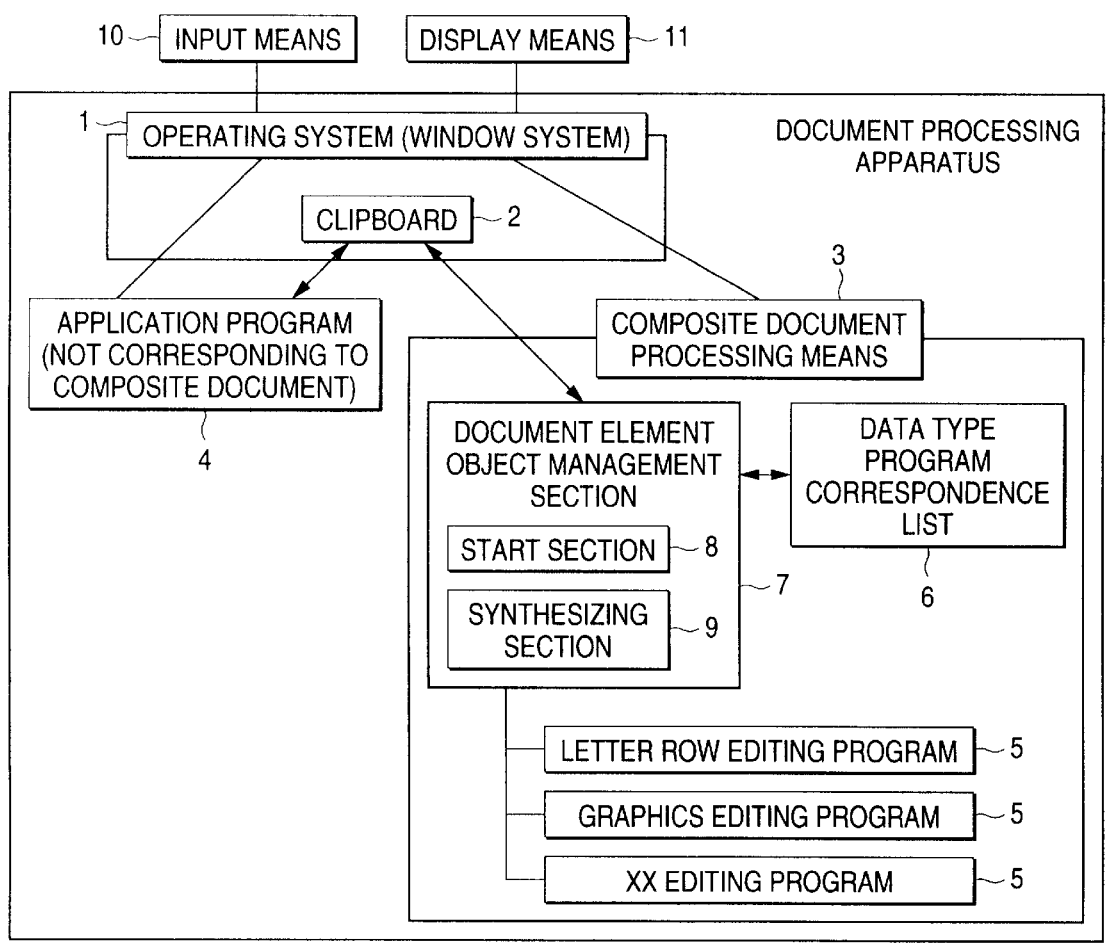
FIG. 1 is a block diagram showing the structure of a document processing apparatus according to an embodiment of the present invention.

As shown in FIG. 1, the document processing apparatus of the present invention is constructed on a multi-task operating system 1, and comprises a clipboard 2 as a storage means for storing document data, a composite document processing means 3 for creating a composite document, and an application program 4 for creating document data such as letter row data, graphic data, etc.

Note that although the application program 4 can create/edit the document data, it does not correspond to a composite document and cannot make the document data into document element data which includes display data etc. as previously described.

In the above composite document processing means 3, a number of types of editing programs 5 such as a letter row editing program, a graphics editing program, etc., a corresponding list 6 for storing a list of information on the editing programs 5, and a document element object managing section 7 for performing start processing etc. of the document editing programs are provided.

The editing programs 5 form a document decomposing means for executing edit-processing such as conversion-processing of the document data into document element data according to data type, for example, a letter row editing program edit-processes the document data of letter row data, a graphics editing program edit-processes the document data of graphics data, a bit map editing program edit-processes the document data of bit map data, a table editing program edit-processes the document data of table data, and a graph editing program edit-processes the document data of graph data.

Figures 2, 3:
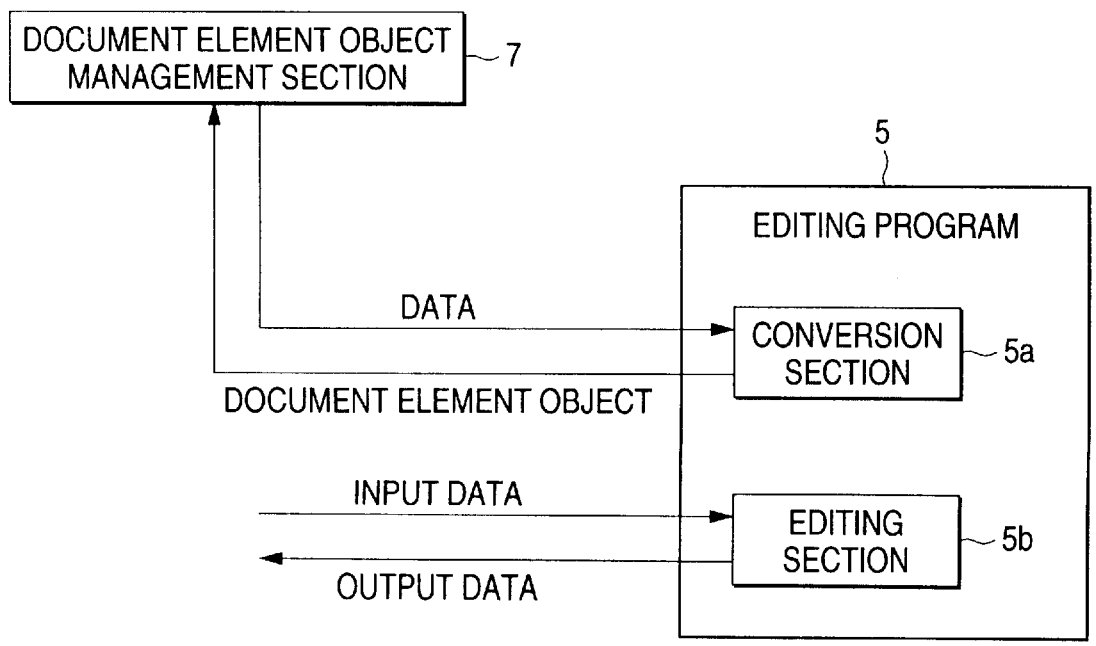
FIG. 2 is an explanatory view showing the stored contents of a corresponding list according to the embodiment of the present invention.
FIG. 3 is a conceptional view showing the structure of an editing program according to the embodiment of the present invention.

Note that, as shown in FIG. 3, in the editing programs 5, in addition to a conversion section 5a for conversion-processing document data into document element data, an editing section 5b for executing edit-processing with respect to real data of the document element data is provided, and is capable of modification-processing where necessary the content of the document element data by means of this editing section 5b.

Also, as shown in FIG. 2, in the corresponding list 6, the file names of the editing programs 5 and data types able to be processed by the editing program are correspondingly stored, for example, the editing program 5 of file name "textedit.exe" is for editing letter row data, the editing program 5 of file name "bitmap.dll" is for editing bit map data, the editing program 5 of file name "figure.exe" is for editing graphics data, the editing program 5 of file name "table.dll" is for editing table data, and the editing program 5 of file name "graph.exe" is for editing graph data.

In addition, the document element object managing section 7 is provided with a start means 8 for starting the editing programs 5 according to the data type of the document data with reference to the corresponding list 6 and a synthesizing means 9 for matching document element data obtained from the editing programs 5 to composite document data and synthesizing document element objects in the composite document, and converts the document data stored in the clipboard 2 to document element data to perform mount-processing thereof in the composite document as document element objects.

Note that an input means 10 such as a keyboard, mouse, etc. and a display means 11 provided with a display etc. are attached to the document processing apparatus, the document processing apparatus performing predetermined document processing based on commands input from the input means 10 and display outputting the result of the document processing at the display means 11.

Figure 4:
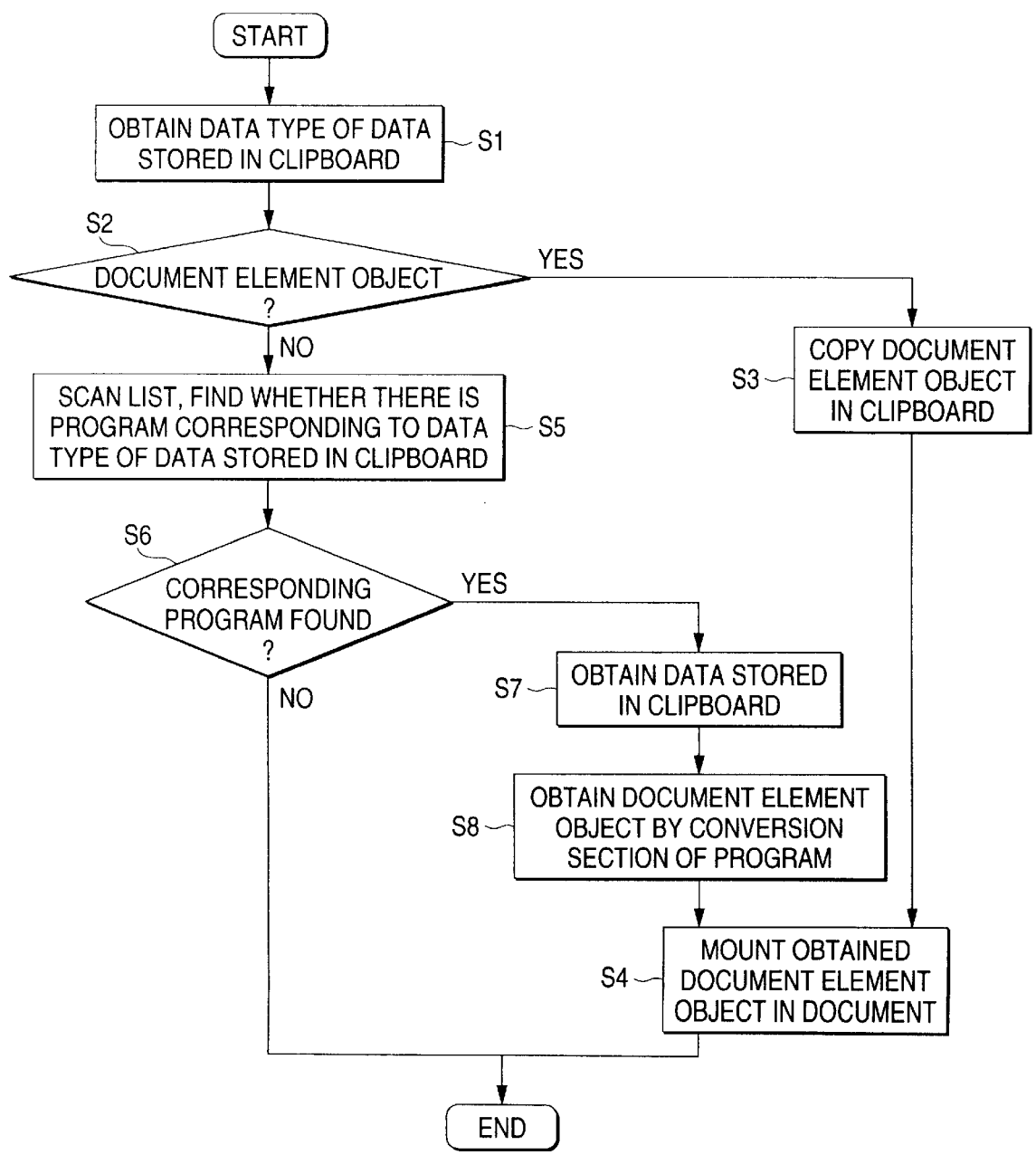
FIG. 4 is a flowchart showing the order of a conversion program according to the embodiment of the present invention.

Next, document element object processing of the document data is performed according to the order shown in FIG. 4.

The user operates the input means 10 and the document data created by the application program 4 is stored in the clipboard 2, whereupon the document element object managing section 7 obtains data type information on the relevant document data from the clipboard 2 (step S1).

Note that generally when the application program creates document data, since information on the data type thereof is attached to the relevant document data, such data type information is stored in the clipboard 2 along with the document data.

Subsequently, from the data type information, the document element object managing section 7 judges whether the document data stored in the clipboard 2 is document element data (document element object) (step S2), where it is document element data, it is copied from the clipboard 2 (step S3), and the synthesizing means 9 matches the relevant document element data to data of the targeted composite document and performs processing to mount the document element object in the composite document (step S4).

Note that the composite document data is stored in a memory means not shown in the drawing and the synthesizing means 9 performs reading out and update writing in of data with respect to the relevant memory means. Also, the composite document data stored in this memory means is read out and display-processed by a display control means not shown in the drawing, and a composite document image is displayed on the display means 11 based on display data in the composite document data.

On the other hand, where the document data stored in the clipboard 2 is not document element data, the start means 8 scans the corresponding list 6 based on obtained data type information, finds whether an editing program 5 for the type of corresponding data is provided in the apparatus (step S5), and judges the existence thereof (step S6).

As a result of this, while the process is ended in case that there is no corresponding editing program, when there is a corresponding program 5, the start means 8 specifies and starts the relevant editing program 5 based on program file name information in the corresponding list 6 (step S8).

In other words, the document element object managing section 7 copies and obtains document data from the clipboard 2, sends this document data to the conversion section 5a of the editing program 5, creates display data from the document data using the print function in the editing program 5, and converts the document data to document element data (document element object) which includes the display data.

Then, the synthesizing means 9 performs processing to mount the document element object in the composite document based on the relevant document element data (step S4) and the process is ended.

As described above, if a number of editing programs 5 corresponding to various data types are provided in the apparatus, since an editing program 5 corresponding to the document data to be processed is automatically selected and started based on data type information obtained from the clipboard 2 and data type information stored in the corresponding list 6, the desired document can be made to a document element object and synthesized into the composite document without the user performing complex operations.

Figures 5, 6:
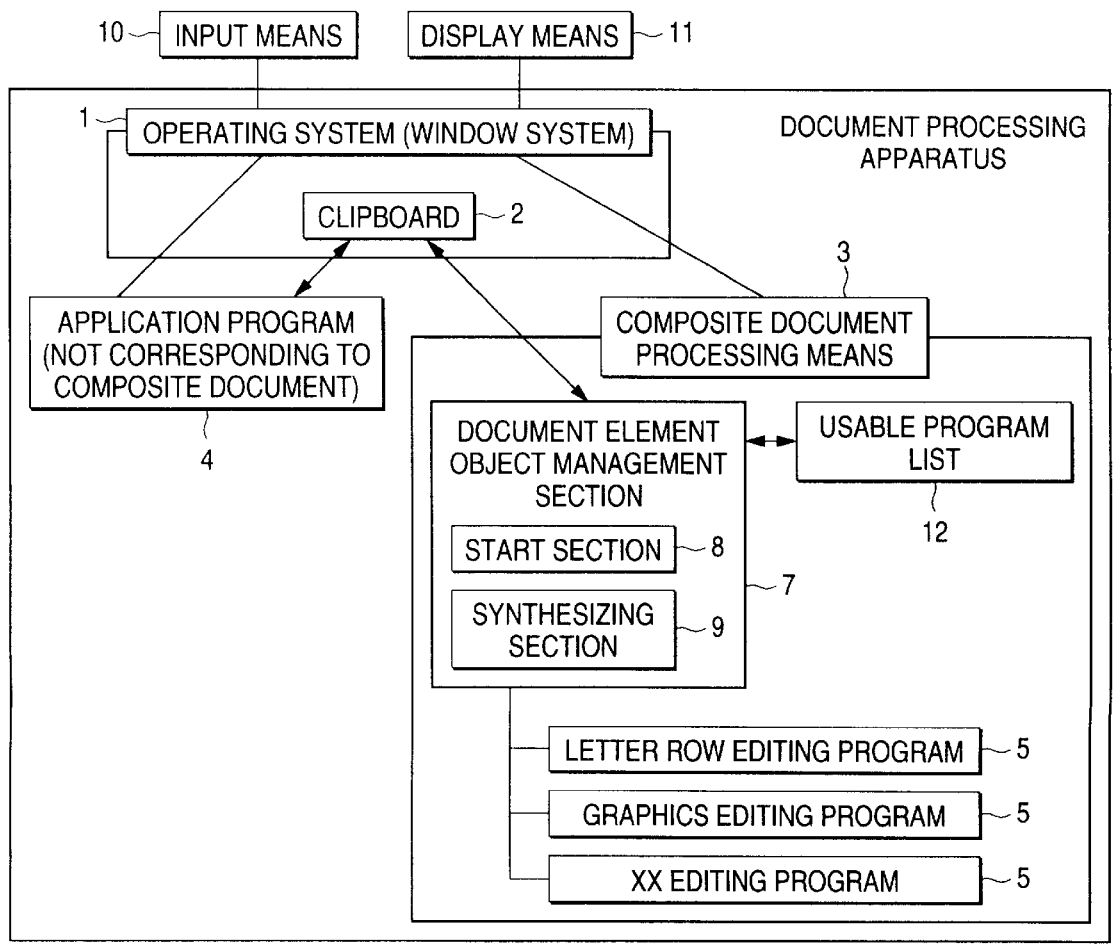
FIG. 5 is an explanatory view showing another example of the stored contents of the corresponding list.
FIG. 6 is a block diagram showing the structure of a document processing apparatus according to another embodiment of the present invention.

FIG. 5 shows a corresponding list 6 according to another embodiment of the present invention.

The present embodiment has as its subject the case where a plurality of editing programs 5 corresponding to the same data type are provided in the apparatus, and the corresponding list 6 further stores "priority order" information showing the order in which the editing programs 5 are started.

For example, when three editing programs 5 exist whose program file names corresponding to letter row data are "text-a.exe", "text-b.exe" and "text-c.exe", these can be set so that the start process is performed in the order "text-a.exe", "text-c.exe" and "text-b.exe" based on the "priority order" information.

Consequently, according to the priority order, for example an editing program with high flexibility is started first, and if the document element object managing means 7 judges that a favorable conversion result has not been achieved from that editing program, the start means 8 starts the next editing program of that priority order, thereby being capable of automatically selecting an editing program so that the optimum conversion result can be achieved.

Note that even if this priority order is not positively provided, when there are a number of editing programs corresponding to the same data type, the program files names thereof may be displayed on the display means 11, the user may select the editing program to be started, and based thereon the start means 8 may start the editing program 5.

FIG. 6 shows a document processing apparatus according to another embodiment of the present invention.

Note that the same components as the previously described embodiment are assigned the same reference numerals and overlapping explanations will be omitted.

In the present embodiment, in place of the corresponding list 6 of the previous embodiment, a usable program list 12 is provided. In this usable program list 12, the file names of editing programs 5 provided in the apparatus are stored as a list, all file names, without being limited to the data type which is the current subject, being stored therein, such as "textedit.exe", "bitmap.dll", "figure.exe", "table.dll" and "graph.exe", for example.

Figures 7, 8:
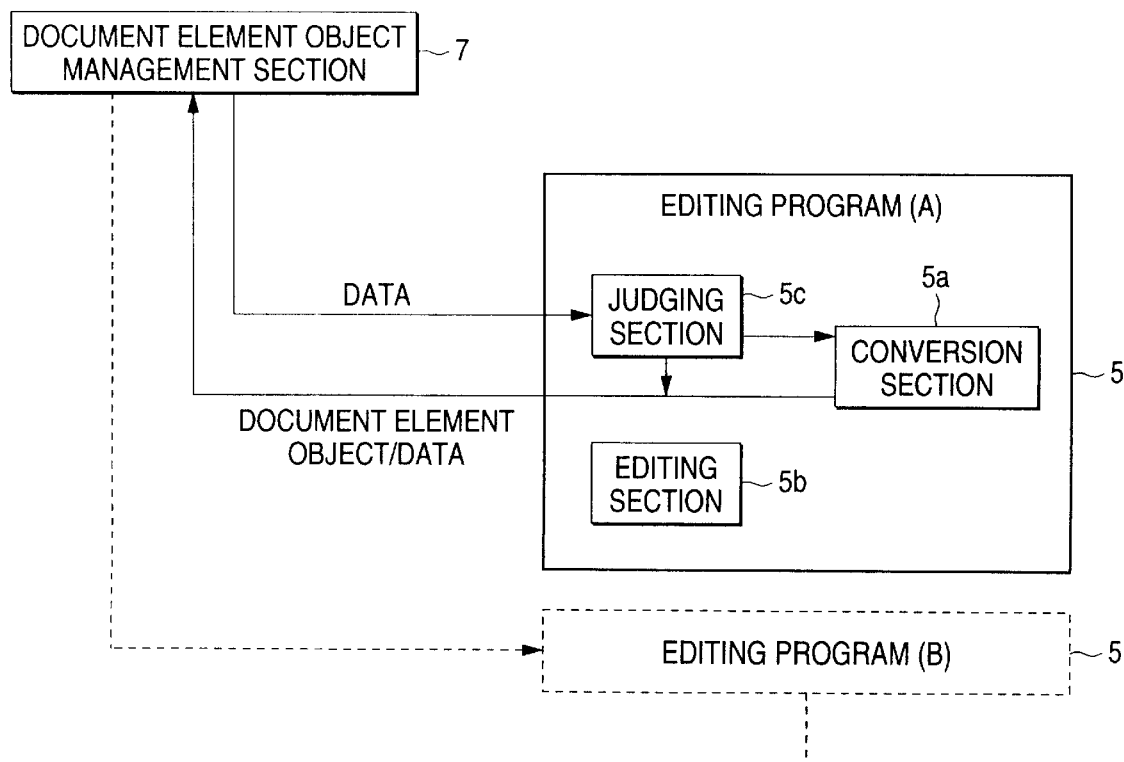
FIG. 7 is an explanatory view showing the stored contents of a usable list according to another embodiment of the present invention.
FIG. 8 is a conceptional view showing the structure of an editing program according to another embodiment of the present invention.

Also, as shown in FIG. 8, in each editing program 5, as well as the conversion section 5a and the editing section 5b, a judgment section 5c for judging the existence of a conversion program based on the data type information is provided. This judgment section 5c judges based on the data type information thereof whether or not the editing program 5 itself can conversion-process document data sent from the document element object managing means 7, and in case that conversion-process can be performed, it makes the conversion section 5a perform conversion-process, while in case that conversion-process cannot be performed, it processes to send an answer back to the document element object managing means 7 to that effect together with the document data.

Also, the start means 8 of the present embodiment performs a process to resend the document data to another editing program 5 according to the answer sent back from this type of judgment section 5c.

Figures 9, 10:
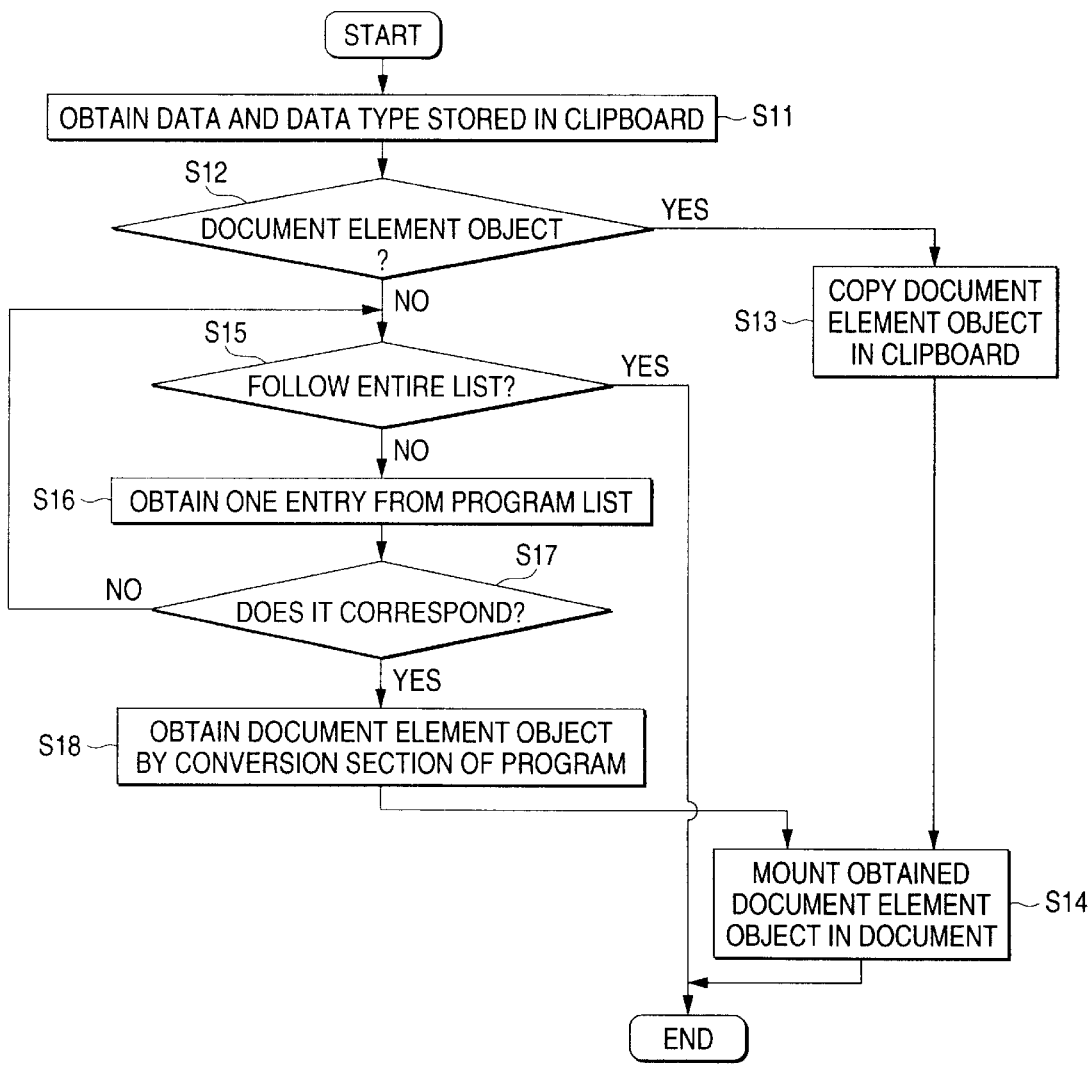
FIG. 9 is a flowchart showing the order of a conversion program according to another embodiment of the present invention.
FIG. 10 is an explanatory view showing another example of the stored contents of a usable list.
Figure 11:
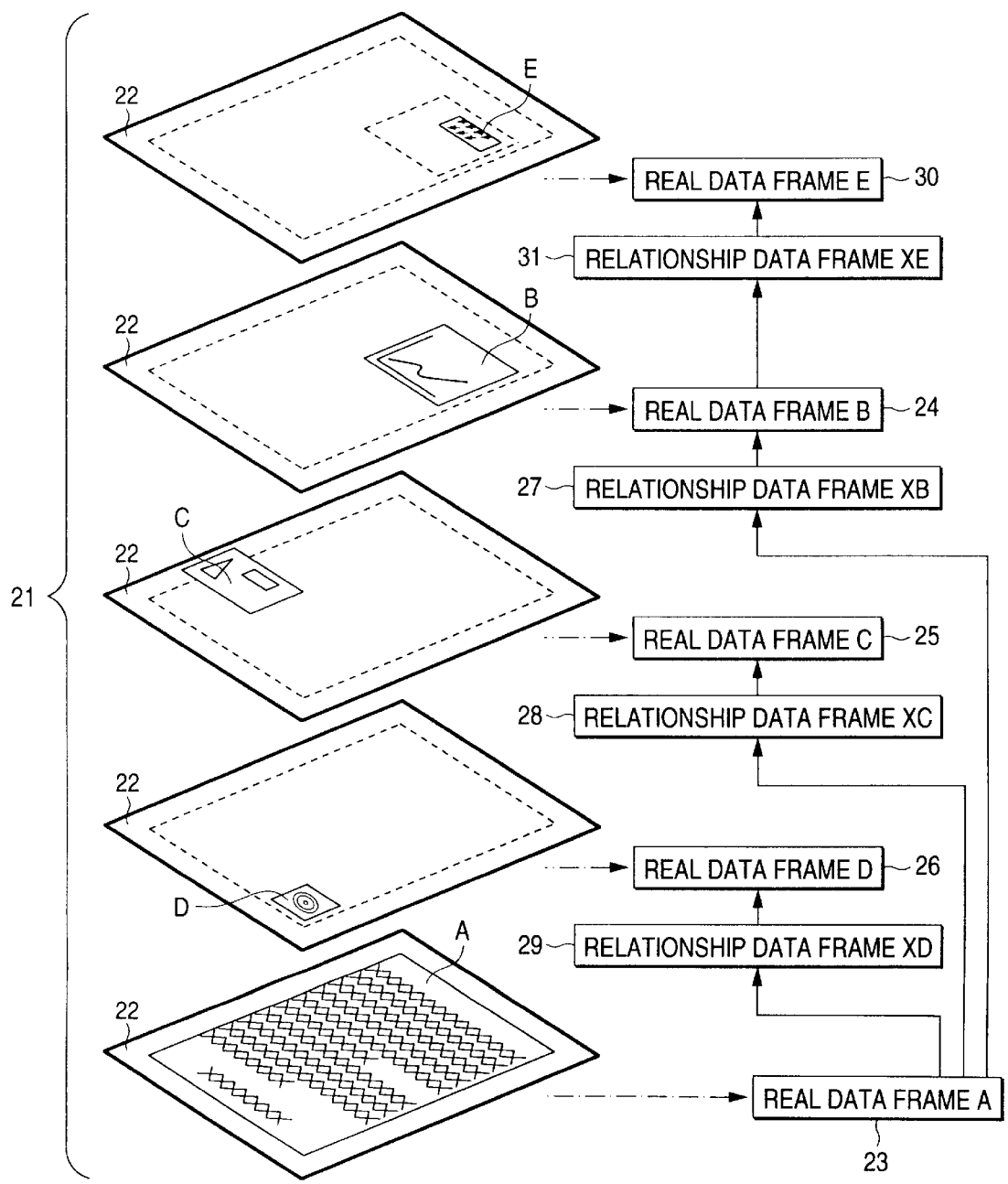
FIG. 11 is a conceptional view for explaining a composite document.
Figure 12:
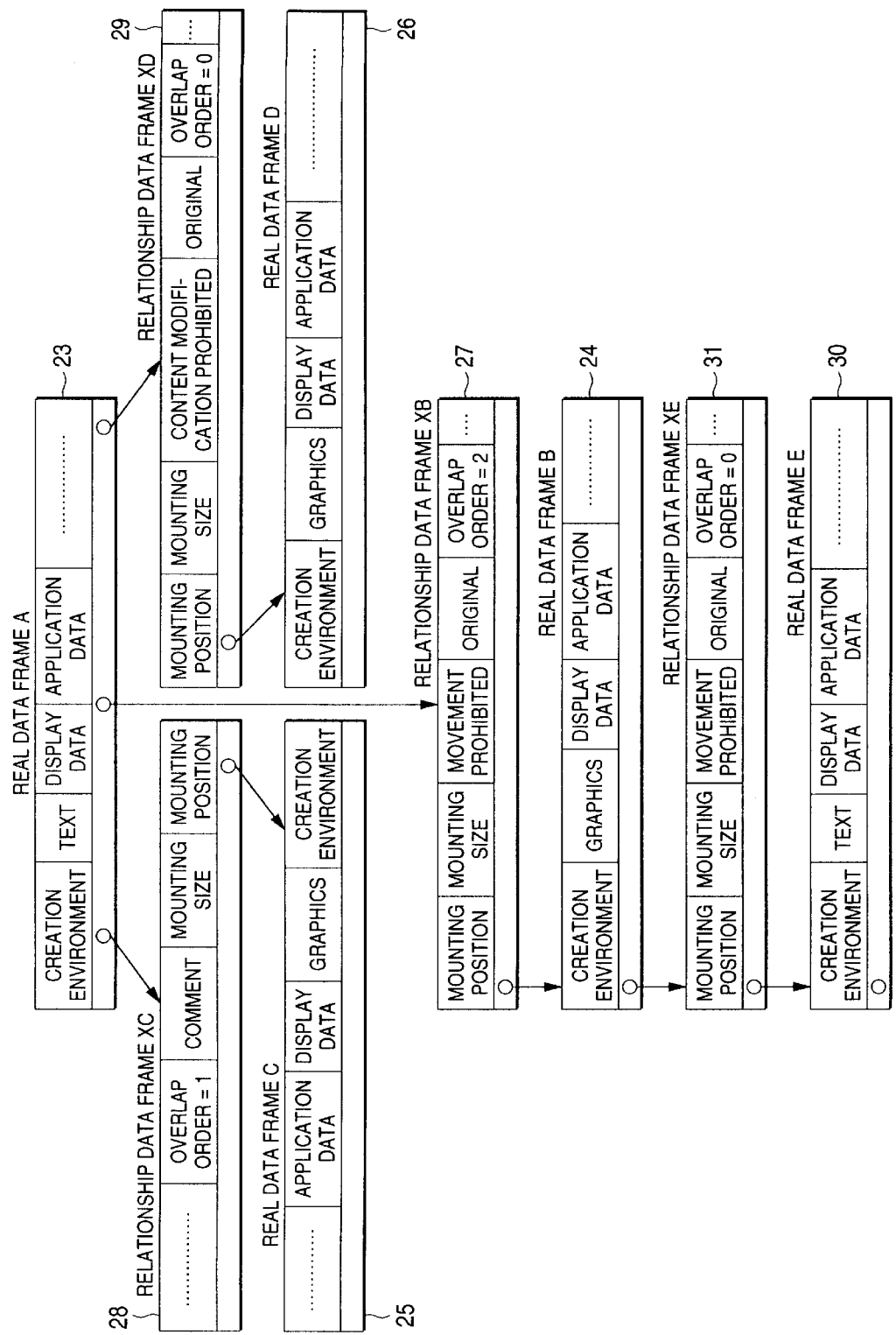
FIG. 12 is a conceptional view showing the data structure of a composite document.

Next, the process of making document data into a document element object is performed according to the order shown in FIG. 9.

When the user operates the input means 10 and the document data created by the application program 4 is stored in the clipboard 2, the document element object managing means 7 obtains the relevant document data and data type information from the clipboard 2 (step S11).

Subsequently, the document element object managing means 7 judges from the data type information whether the document data stored in the clipboard 2 is document element data (document element object) (step S12), and in case that it is document element data, it is copied from the clipboard 2 (step S13), the synthesizing means 9 matches the relevant document element data with data of the targeted composite document, and the process of mounting the document element object in the composite document is finished (step S14).

On the other hand, when the document data stored in the clipboard 2 is not document element data, the start means 8 scans the usable list 12 based on the obtained data type information (step S15), takes out one set of program file name information from the top of the list (step S16), and sends this data type information together with the document data to an editing program 5 corresponding to the file to start the editing program.

Subsequently, based on the sent data type information, the judgment section 5c judges whether the editing program itself can conversion-process the relevant data type (step S17), and where it cannot convert, sends the document data and the data type information back to the start means 8.

As a result of this, the start means 8 performs the process as described above on an editing program corresponding to the next file name on the usable list 12. Then if an editing program 5 corresponding to the data type cannot be found even when all of the editing programs 5 provided in the apparatus are operated based on the usable list 12, since the document element object process cannot be performed, the process is finished as is.

On the other hand, when a corresponding editing program 5 is found by the above operating process, the judgment section 5c of the relevant program delivers the sent document data to the conversion section 5a, display data is created from the document data using the print function, and the document data is converted to document element data (document element object) which includes the display data (step S18).

Then, the synthesizing means 9 performs a process of mounting the document element object into the composite document based on the relevant document element data (step S14) and the process is finished.

As described above, in the present embodiment, if a number of editing programs 5 corresponding to various data types are provided in the apparatus, since an editing program 5 corresponding to document data to be processed is automatically selected and started based on the data type information obtained from the clipboard 2 and file name information stored in the usable list 12, the desired document is made into a document element object and synthesized into the composite document without the user performing complex operations.

FIG. 10 shows a usable list 12 according to another embodiment of the present invention.

Although the above-described embodiment is such that the editing programs 5 are started one by one from the top of the usable list 12, in the present embodiment, "priority order" information showing the order in the usable correspondence list 12 in which editing programs 5 are started is further stored so that the user can set the starting order.

Accordingly, based on the "priority order" information, start processing of the editing programs 5 provided in the apparatus is performed in the order of program file names "textedit.exe", "figure.exe", "graph.exe", "table.dll" and "bitmap.dll" for example.

Consequently, according to priority order, editing programs corresponding to data types whose frequency of use is high, for example, are started first, and the editing programs can be automatically selected so that the conversion results can be obtained speedily.

Note that even if the priority order is not positively provided in this way, the plurality of editing programs provided in the apparatus may be shown in the display means 11 under their program file names, the user may select the editing program to be started, and based thereon the start means 8 may start the editing program 5.

In the embodiment described above, although the judging section 5c judges whether the editing program 5 itself can perform conversion-process or not, even without positively providing this judging means 5c, for example, the time lapse from when the start means 8 sends the document data may be measured by a timer and when a conversion result has not been obtained after a lapse of a predetermined time period, the next editing program according to the usable list 13 may be started.

As described in detail above, according to the document processing apparatus of the present invention, since it automatically selects a plurality of document decomposing means (editing programs) and performs conversion-processing of document data, a document element object can be obtained from various types of document data and mount-processed into a composite document without forcing the user to perform complex operations. Consequently, electronic data documents can be freely and simply mounted as if they are paper medium documents to create a composite document.

Further, according to the document processing apparatus of the third aspect of the invention, because the document decomposing means judges whether document data can be conversion-processed by itself, in addition to the above effects, as well as simplifying the structure of the list means, the corresponding document decomposing means can be searched speedily.

Further still, according to the document processing apparatus of the fourth aspect of the invention, because a starting order of the document decomposing means is stored in the list means, in addition to the above effects, the corresponding document decomposing means can be searched speedily while reflecting the intentions of the user.

What is claimed is:

1. A document processing apparatus for creating composite documents formed of document element objects by correlating a plurality of document element data, said document processing apparatus comprising:

holding means for holding document data which is to be processed and for holding data type information for each document data;

a plurality of document decomposing means for conversion-processing different types of document data into document element objects;

list means for holding data type information indicating which data type can be processed by each of the document decomposing means;

judging means for judging whether document data requires conversion-processing:

start means for starting corresponding document decomposing means based on the data type information held in the list means that corresponds to the data type information of the document data held in the holding means only if the document data requires conversion-processing; and synthesizing means for synthesizing the document element objects into a composite document by correlating the document element objects obtained from the document decomposing means with composite document data.

2. The document processing apparatus according to claim 1, wherein the list means stores priority order information of the document decomposing means started by the start means.

3. A document processing apparatus for creating composite documents formed of document element objects by correlating a plurality of document element data, said document processing apparatus comprising:

holding means for holding document data which is to be processed and for holding data type information for each document data;

a plurality of document decomposing means for conversion-processing different types of document data into document element objects;

list means for holding information indicating which data type can be processed by each of the document decomposing means;

judging means for judging whether document data requires conversion-processing;

start means for starting document decomposing means based on information held in the list means that corresponds to the data type information of the document data held in the holding means only if the document data requires conversion-processing; and synthesizing means for synthesizing the document element objects into a composite document by correlating the document element objects obtained from the document decomposing means with composite document data, wherein when a conversion result cannot be obtained from one document decomposing means, the start means sequentially starts another document decomposing means based on information held in the list means.

4. The document processing apparatus according to claim 3, wherein the list means stores priority order information of the document decomposing means started by the start means.

* * * * *